No. 847,440. PATENTED MAR. 19, 1907.
E. RIVETT.
DRIVING MECHANISM.
APPLICATION FILED NOV. 2, 1905.

2 SHEETS—SHEET 1.

Witnesses:
Fred. S. Greenleaf
Walter R. Trott

Inventor
Edward Rivett,
by Crosby Gregory
Attys.

No. 847,440. PATENTED MAR. 19, 1907.
E. RIVETT.
DRIVING MECHANISM.
APPLICATION FILED NOV. 2, 1905.

2 SHEETS—SHEET 2.

Witnesses:
Fred S. Greenleaf
Walter R. Trott

Inventor:
Edward Rivett
by Crosby Gregory
Attys.

UNITED STATES PATENT OFFICE.

EDWARD RIVETT, OF BOSTON, MASSACHUSETTS.

DRIVING MECHANISM.

No. 847,440.　　　　Specification of Letters Patent.　　Patented March 19, 1907.

Application filed November 2, 1905. Serial No. 285,526.

*To all whom it may concern:*

Be it known that I, EDWARD RIVETT, a citizen of the United States, and a resident of Boston, in the county of Suffolk and State of Massachusetts, have invented an Improvement in Driving Mechanism, of which the following description, in connection with the accompanying drawing, is a specification, like letters on the drawings representing like parts.

This invention has for its object to provide a novel driving mechanism by means of which a rotating shaft or spindle may be relieved of all unbalanced lateral strains or stresses which would produce greater pressure on one side of the bearing than on the other, whereby said shaft or spindle may be driven at an excessively high speed without any appreciable jar or vibration and without any undue heating of the bearing. This object is accomplished by so arranging the driving mechanism that all the lateral strains or stresses on the driven shaft or spindle are balanced or equalized. Such balancing or equalization of the lateral strains may be secured in several ways—as, for instance, by driving the driven shaft or spindle from a plurality of driving-shafts which are so situated with relation to the driven shaft that the lateral stresses on the driven shaft caused by the driving action of any driving-shaft are counterbalanced or offset by other lateral stresses caused by the driving action of another driving-shaft or by driving the driven shaft from one driving-shaft and then subjecting the driven shaft to the action of a balancing device which offsets or balances the lateral stresses on the driven shaft caused by the action of the driving-shaft.

I will now describe some embodiments of my invention and then will point out the novel features thereof in the appended claims.

Figure 1:
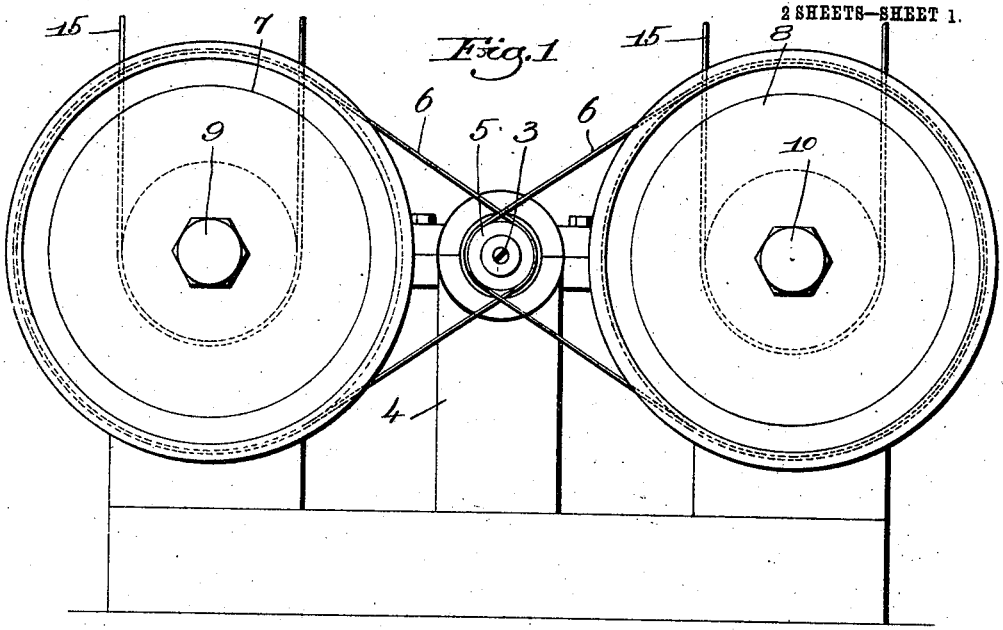
Figure 2:
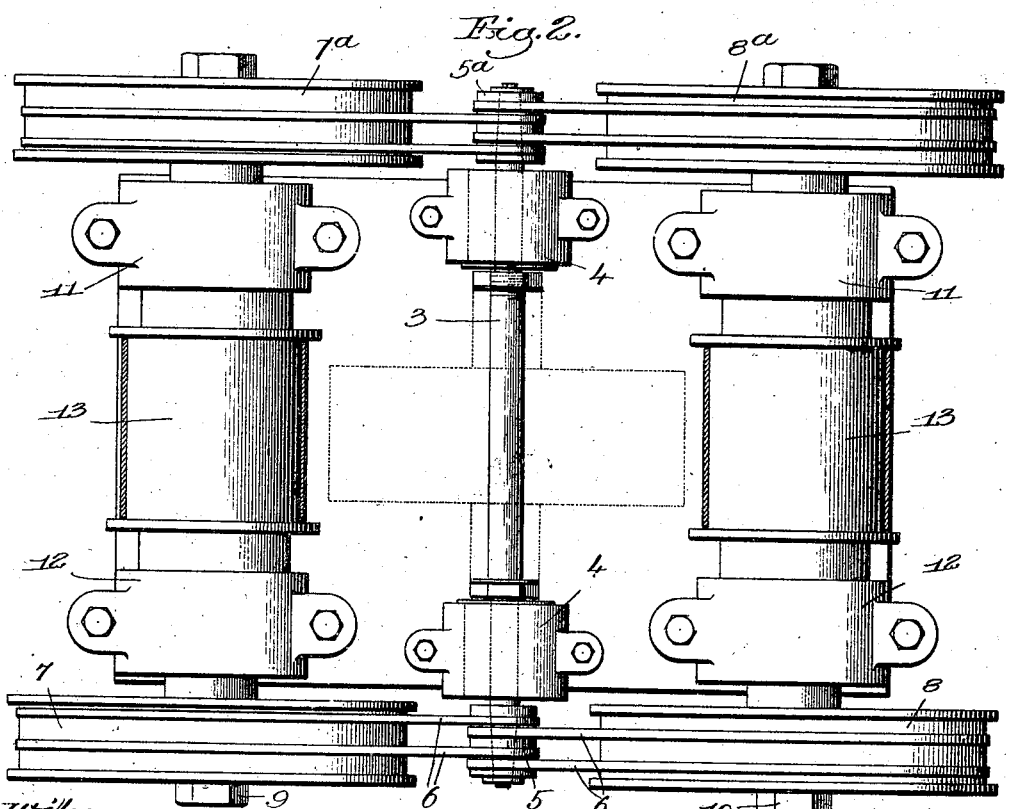
Figure 3:
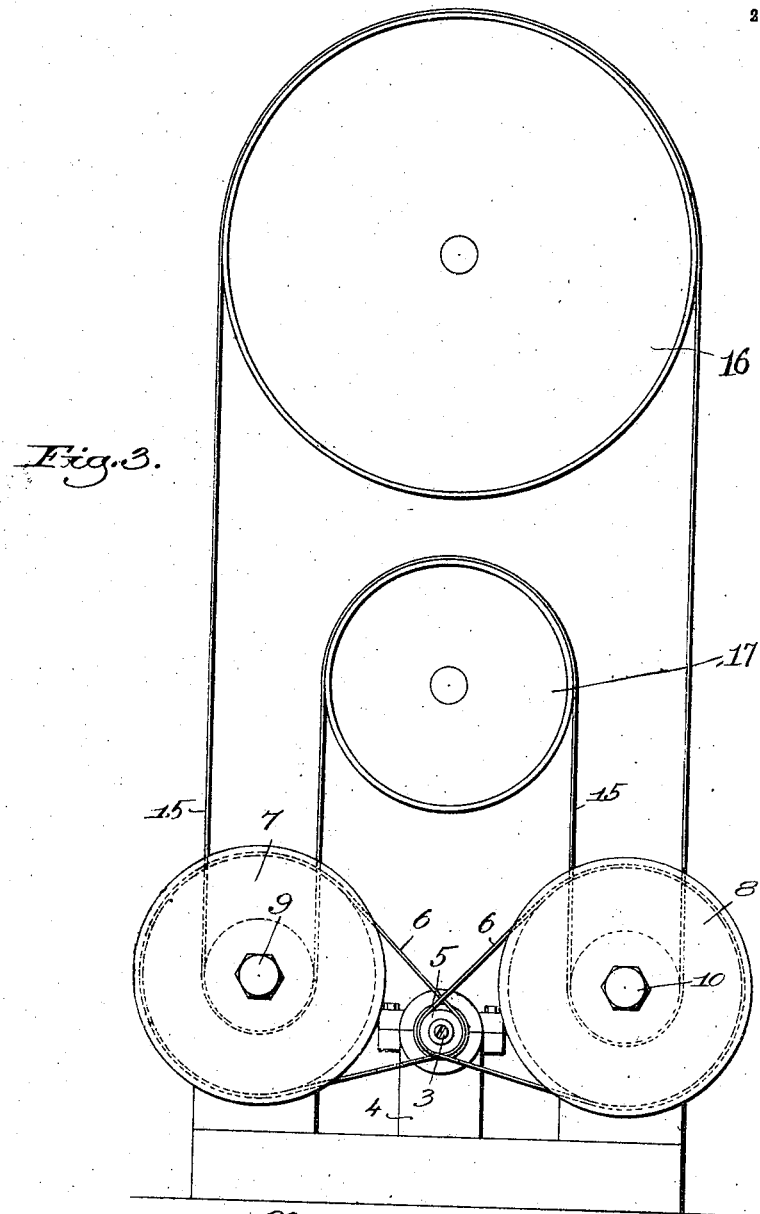

In the drawings, Figure 1 is a side view of a driving apparatus embodying my invention. Fig. 2 is a top plan view of Fig. 1. Fig. 3 is a side view showing a different arrangement from that shown in Fig. 1, and Figs. 4 and 5 show still other arrangements.

The driven shaft or spindle is designated by 3, and it is supported in any suitable bearings, two bearings 4 being shown herein.

In the form of the invention shown in Figs. 1 to 3 the driven shaft or spindle 3 is driven from two driving-shafts, (designated 9 and 10, respectively,) said driving-shafts being located on opposite sides of the driven shaft. Each driving-shaft has thereon a driving-pulley, said pulleys being designated by 7 and 8, respectively, and they are connected to the pulley 5 on the driven shaft by means of suitable belts 6. By arranging the two driving-pulleys on opposite sides of the driven shaft it will be observed that any lateral stresses to which the shaft 3 is subjected by the belt 6 connecting either driving-shaft with the driven shaft are offset or counterbalanced by other lateral stresses caused by the operation of the other belt 6. In order to completely counterbalance all lateral stresses in the driven shaft, I propose to arrange the driving-pulleys, belts, bearings, &c., for all the shafts symmetrically, as shown in the drawing—that is, when the driven shaft is supported by the two bearings 4, as shown in Fig. 2, and is driven from the end thereof I will arrange on each end of said shaft a pulley which is belted to properly-arranged driving-pulleys on the driving-shafts 9 and 10. In the embodiment of the invention shown in Fig. 2 the driven shaft 3 has a pulley 5 on one end thereof outside the bearing 4, which is driven from the two driving-pulleys 7 and 8, above referred to, and on the other end it has another pulley 5$^a$, which is driven by belts from two pulleys 7$^a$ and 8$^a$, properly arranged on the driving-shafts 9 and 10. It will be noted that the bearings 11 and 12 for the two driving-shafts 9 and 10 are arranged symmetrically with relation to the belt-pulleys 13 on said driving-shafts, and therefore the bearings and pulleys on both the driving and the driven shafts are arranged symmetrically. Where both the shafts 9 and 10 are driving-shafts—that is, shafts which operate to drive or give rotation to the driven shaft—it is desirable that said driving-shafts rotate at the same speed, and to accomplish this I have shown them as being driven by the same driving-belt 15, which passes over a driving-pulley 16, around the pulleys or drums 13, and over an idler 17, as best seen in Fig. 3. In the embodiment of the invention shown in Fig. 1 the driving and driven shafts are arranged parallel with each other and the driven shaft is in substantially the same horizontal plane as the driving-shafts. With this arrangement it will be seen that each lateral stress to which the driven shaft is subjected by the operation of the belts from either driving-shaft will be counterbalanced by an opposing stress resulting from the action of the driving belts from the other driving-shaft. If it is desired to relieve the driven shaft not only of all lateral stresses due to the action of the driving-belts, but also to relieve the bearings of the driven shaft of the weight of said shaft, said driven shaft may be placed sufficiently below the plane of the driving-shafts 9 and 10 so that the upward lift of the driving-belts will counterbalance the action of gravity on the driven shaft. Such an arrangement is shown in Fig. 3, and in this embodiment of the invention the driven shaft is so perfectly balanced that there will be no lateral pressure in any direction on the bearing thereof.

Figure 4:
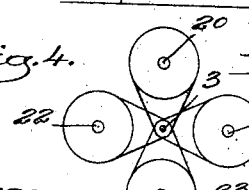
Figure 5:
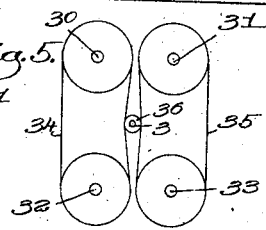

In Fig. 4 I have illustrated diagrammatically still another arrangement, wherein the driven shaft 3 is driven from four driving-shafts, (designated 20, 21, 22, and 23, respectively,) each driving-shaft being belted separately to the driven shaft and said driving-shafts being so arranged that each lateral stress to which the driven shaft is subjected is counterbalanced.

In Fig. 5 I have shown still another arrangement of driving and driven shafts by which the desired result may be accomplished. In this embodiment of the invention there are four driving-shafts 30, 31, 32, and 33 and only two driving-belts 34 and 35, each driving-belt passing around the driving-pulleys and two adjacent driving-shafts and contacting with one side of the pulley 36 on the driven shaft 3. The four driving-pulleys and the driving-belts are so arranged that all lateral stresses to which the driven shaft is subjected are balanced. Other arrangements of driving and driven shafts which will accomplish this result may be employed without departing from the invention.

I have also found that better results may be secured by employing elastic belts for each driving-pulley which are working under considerable tension, as best shown in Fig. 2. In fact, I have found that by employing the arrangement shown in Fig. 2 the driven shaft 3 may be run at a speed of something like seventy-five thousand revolutions a minute without creating any appreciable jar or vibration.

Having fully described my invention, what I claim as new, and desire to secure by Letters Patent, is—

1. In a device of the class described, the combination with a driven shaft of a plurality of driving-shafts belted thereto to both drive the driven shaft and balance or neutralize all lateral stresses thereon, and means to rotate the driving-shafts.

2. In a device of the class described, the combination with a driven shaft of symmetrically-arranged pulleys thereon, and a symmetrically-arranged driving mechanism including symmetrically-arranged belts for rotating said pulleys.

3. In a driving mechanism, the combination with a driven shaft of a pulley at each end thereof, a plurality of driving-shafts parallel with the driven shaft, driving-pulleys on each driving-shaft to correspond to those on the driven shaft, belts connecting each driving-pulley to the corresponding pulley on the driven shaft, and means to rotate the driving-shafts in unison.

4. In a driving mechanism, a driven shaft, a pulley thereon, a plurality of driving-shafts, a driving-pulley on each driving-shaft, and a plurality of elastic belts connecting each driving-pulley to the pulley on the driven shaft, said driving-shafts being so arranged that all lateral stresses on the driven shaft are balanced.

In testimony whereof I have signed my name to this specification in the presence of two subscribing witnesses.

EDWARD RIVETT.

Witnesses:
 LOUIS C. SMITH,
 MARGARET A. DUNN.